United States Patent [19]
Wallick

[11] Patent Number: 5,332,458
[45] Date of Patent: * Jul. 26, 1994

[54] CORRUGATED PAPERBOARD STRENGTH ENHANCING PROCESS

[76] Inventor: Scott A. Wallick, 17848 3rd Pl. SW., Seattle, Wash. 98166

[*] Notice: The portion of the term of this patent subsequent to Mar. 8, 2011 has been disclaimed.

[21] Appl. No.: 692,861

[22] Filed: Apr. 29, 1991

[51] Int. Cl.$^5$ .............................................. B31F 1/28
[52] U.S. Cl. ................................... 156/210; 156/205; 156/307.3; 8/192; 427/391; 428/425.1
[58] Field of Search ...................... 156/210, 205, 331.4, 156/307.3; 428/425.1; 8/192; 427/391; 118/324

[56] References Cited

U.S. PATENT DOCUMENTS

| | | | |
|---|---|---|---|
| 1,199,508 | 9/1916 | Swift, Jr. | 156/210 X |
| 3,189,502 | 6/1965 | Little | 156/210 X |
| 3,341,354 | 9/1967 | Woods et al. | 118/324 X |
| 3,485,575 | 12/1969 | Christian et al. | 8/192 |
| 3,586,564 | 6/1971 | Brackett . | |
| 3,616,163 | 10/1971 | Reisman . | |
| 3,953,169 | 4/1976 | Igarashi et al. | 8/192 |
| 4,029,846 | 6/1977 | Decker et al. | 428/425.1 |
| 4,582,735 | 4/1986 | Smith | 428/425.1 X |
| 4,617,223 | 10/1986 | Hiscock et al. | 8/192 |
| 4,623,412 | 11/1986 | Bohme et al. | 156/210 X |

FOREIGN PATENT DOCUMENTS

| | | |
|---|---|---|
| 0077131A3 | 9/1982 | European Pat. Off. . |
| 57-182436 | 10/1982 | Japan . |
| 59-47497 | 3/1984 | Japan . |
| 59-112096 | 6/1984 | Japan . |
| 59-179896 | 10/1984 | Japan . |
| 62-152735 | 7/1987 | Japan . |
| 1236728 | 3/1970 | United Kingdom . |

OTHER PUBLICATIONS

PCT/US92/03641: PCT International Search Report mailed Oct. 21, 1992.
K. Asai et al., "The Use of Modified Polymeric MDI in Reinforced Corrugated Fibreboard Container System," 30th Annual Polyurethane Technical/Marketing Conference, Oct. 15–17, 1986, pp. 176–181.

Primary Examiner—Michael W. Ball
Assistant Examiner—Michele K. Yoder

[57] ABSTRACT

A corrugated paperboard strength enhancing process includes at least one resin application station located within the confines of the corrugator at a position where it is operable to apply a preselected amount of a strength enhancing resin to at least one side of the medium after it has been fluted. At least one liner is adhered to the set of opposed flute tips. Thereafter the combined board with the resin compound on selected transverse portions of the fluted medium is allowed to cure, under selected temperature and moisture conditions and without the application of pressure that would crush the fluted medium. A suitable resin for the intended purpose is an isocyanate compound.

20 Claims, 6 Drawing Sheets

CORRUGATED PAPERBOARD STRENGTH ENHANCING PROCESS

BACKGROUND OF THE INVENTION

The present invention relates generally to corrugated packaging materials and more particularly to a process for enhancing the strength of the materials and thereby the resulting packages.

Corrugated board generally refers to a composite laminated structure comprising two paper linerboard sheets bonded to a paper corrugated or fluted core material. In the context of the present description a corrugated material will mean at least one liner sheet bonded to at least one fluted layer. Single faced corrugated board refers to the structure where there are single sheets of linerboard bonded to the tips of a single fluted core layer. There are various other combinations which can be fabricated to form various well know products such as double wall board, triple wall board, and the like.

The typical process for forming corrugated materials is well known and typically the single wall corrugated board will be formed on an in-line corrugator where large rolls of linerboard paper and a large roll of the medium paper (the starting raw material for forming the corrugated core layer) will be positioned at the upstream end of the corrugator. The process normally has the medium passing through a set of corrugating rolls and thereafter being bonded to the first liner as it travels in a downstream direction. A suitable adhesive is utilized to attach the flute tips on one side to the inside surface of the first liner. Thereafter, at a downstream location the other liner material is laminated to the other flute tips with a suitable adhesive to form the combined board. Thereafter the combined board travels into a heating and cooling section to allow the adhesive to fully cure and bond the liners to the fluted medium. Immediately thereafter slitter-scorer and cutoff devices function to produce individual flat sheets of slit and scored blanks for converting into containers.

As is well recognized by those skilled in the art, the structural requirements for combined board are determined by the particular requirements of the end use. Standards have been developed over the years and both the liner and medium materials are manufactured to preselected basis weights with the end-use requirements in mind. In a container a particularly important property is vertical stacking strength (top to bottom) where the vertical walls in a container are expected to support in-use compression loadings. In almost all packaging end uses the fluted medium will be oriented in a vertical direction in the package side walls. In this orientation the liners and fluted medium will provide good vertical stacking strength. Another strength property relates to the crushing resistance (flat crush) of the combined board in a plane perpendicular to the plane of the combined board. This property depends upon the strength of the corrugated medium.

The vertical stacking strength for a container depends to a large extent upon the basis weights of the component materials. With higher basis weights for the component materials the higher the vertical stacking strength and normally the greater the top-to-bottom crush resistance. When a package needs greater stacking strength, higher basis weights will be utilized. Normally it is the customer that specifies the strength requirements and the corrugated board manufacturer will produce the packaging material accordingly. A typical combined board with medium strength is one that utilizes liner sheets with a 42 pound basis weight (pounds per thousand square feet) and with a medium material of 33 pounds. Typically, a package comprised of this combined board will result in an edgewise compression test (ECT) or short column value of about 45 pounds per lineal inch. A higher stacking strength can be provided by using liner sheets with a basis weight of 69 pounds and a medium basis weight of 33 pounds. This gives an ECT of about 59 lbs/in. Obviously, in order to create the higher basis weights, additional fiber must be utilized which adds to the cost of producing the combined board and the resulting container.

Ways have been sought for many years to increase stacking strength and/or crush resistance without the need for utilizing additional fiber. One suggested approach has been to utilize resin compounds sprayed or otherwise coated onto one or both of the liner sheets or onto the medium material before it is fluted. In the past isocyanate compounds have been suggested as a suitable resin which after curing will add strength to the particular component of the combined board. Most of these chemical additives and their processing requirements have not resulted in commercially viable strength enhancing processes and products. Problems revolve around resin handling, safety issues, costs, recycling and the like.

While the addition of resin is known for increasing the strength of packaging materials, one of its inherent problems is that once the resin cures it tends to yield a paper that is brittle and relatively inflexible. After the combined board is produced and cut into flat sheets, then the package itself must be erected. This commonly requires a plurality of slitting, scoring and folding steps which presents problems for a sheet material that is relatively brittle. One of the problems with resin additions has been the difficulty in forming good containers with treated corners that do not fracture.

The assignee of the present invention has developed a process for enhancing the strength of corrugated board packaging materials that impacts the aforementioned problems. Relatively low amounts of selected isocyanate compounds have been found to provide significant strength enhancement in the combined board when applied according to the steps of the present invention.

Accordingly, from the foregoing, one object of the present invention is to enhance the strength characteristics of corrugated board packaging material.

A further object of the present invention is to utilize relatively small amounts of isocyanate resin compounds for the strength enhancing purpose.

Yet another object of the present invention is to increase both short column strength (top to bottom) and flat crush resistance in a combined board packaging material without utilizing more fiber.

An additional object of this invention is to provide a strengthened packaging material that has the same characteristics of existing packaging materials in areas such as surface friction, white top compatibility, color and recyclability.

Still another object is to minimize the contamination of the corrugator equipment with the strength enhancing resin by applying the liner adhesive and liner essentially immediately after the resin is applied to the fluted medium.

These and other objects of the present invention will be better understood upon reading the specification to follow in conjunction with the attached drawings.

SUMMARY OF THE INVENTION

Briefly stated the present invention is practiced in one form by applying a relatively small amount of a preselected strength enhancing compound to the medium material after it has been fluted, then applying at least one liner and thereafter allowing the resin to cure, thereby providing enhanced strength to the corrugated combined board.

DETAILED DESCRIPTION OF THE PREFERRED EMBODIMENT

Figure 1A:
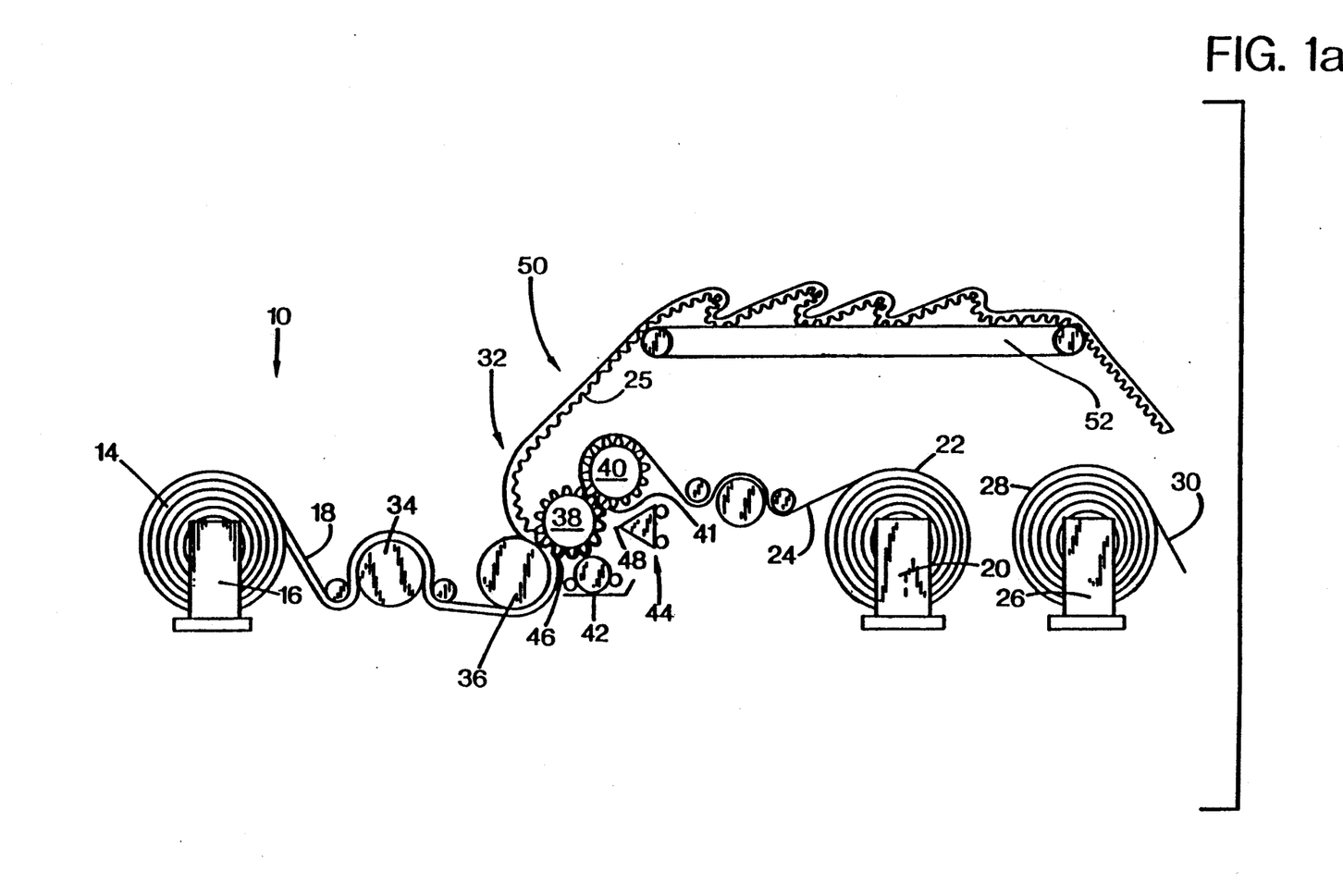
FIGS. 1a and 1b are schematic representations of an in-line corrugated board manufacturing process including a depiction of where A or A resin application stations can be located.
Figure 1B:
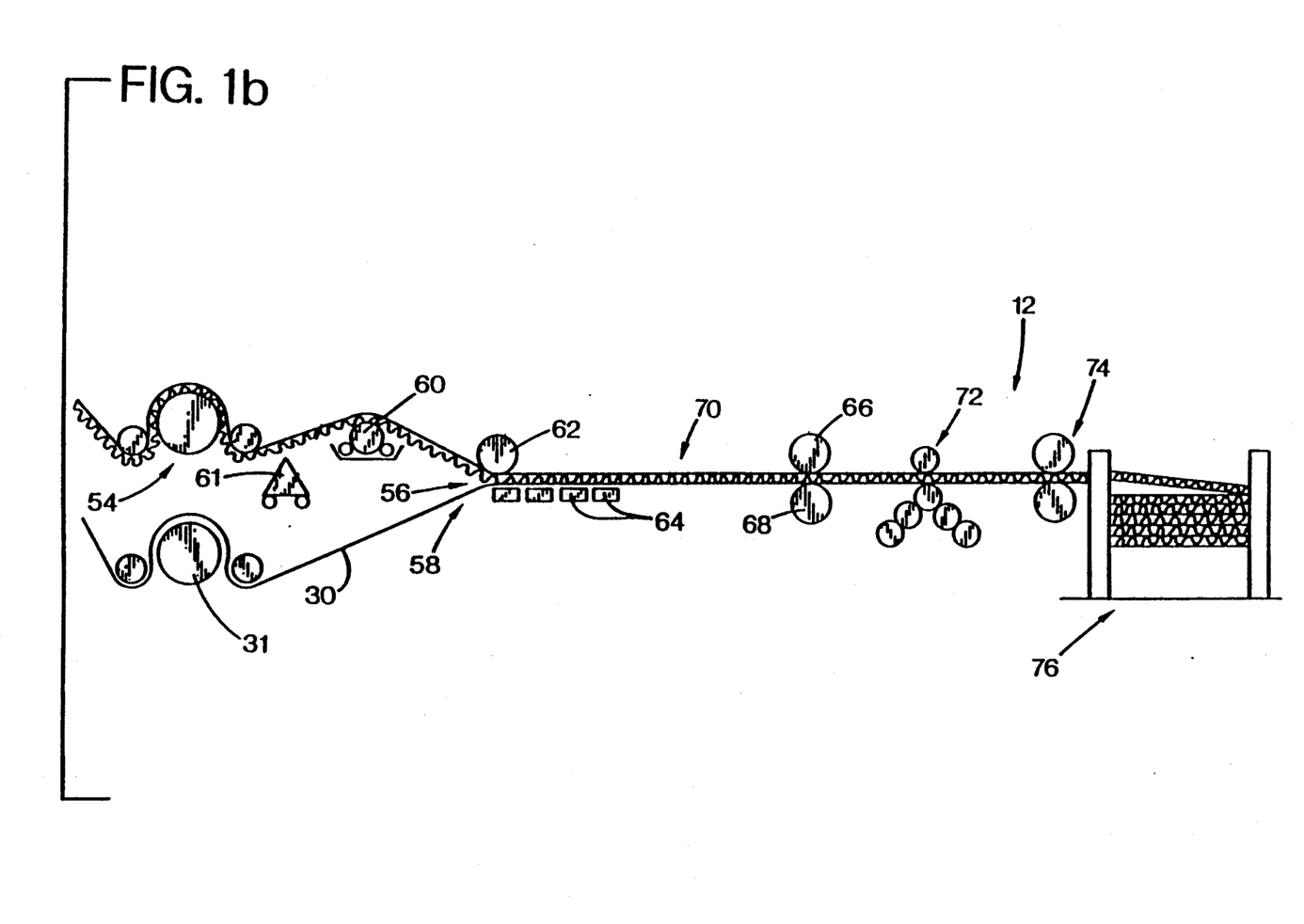

Referring first to FIGS. 1a and 1b, a typical state-of-the-art corrugating system showing alternative locations for resin application stations will be described. Briefly an upstream end is indicated at 10 and a downstream end at 12. At the extreme upstream end of the corrugator is a source of linerboard 14. Typically linerboard comes in roll stock form having been manufactured at a linerboard mill. It is mounted on stand 16 which allows it to be unrolled continuously in flat sheet form. The traveling flat sheet form is indicated throughout the process flow at 18. Shown positioned on stand 20 is a roll of medium 22. Throughout the process flow the flat medium in traveling sheet form is indicated at 24. A second liner stand 26 is positioned downstream from medium stand 20 and has a second roll of linerboard 28 mounted thereon. Extending outwardly from second liner roll 28 is the flat sheet of traveling liner 30 which begins its downstream travel from stand 26. Indicated generally at 32 is a single facer station where the first linerboard traveling flat sheet is bonded to one set of fluted tips on the corrugated or fluted medium 25. Just upstream from single facer station 32 is preheater 34 and pressure roll 36. Preheater 34 serves to heat the traveling first liner 18 in order to aid in curing of the adhesive. Pressure roll 36 serves to keep the sheet flat and under proper tension as it travels into the single facer station 32. Adjacent single facer station 32 is a pair of corrugating rolls 38, 40 which are standard and well known to those skilled in the art and they serve to form flutes in the incoming traveling medium 24. Where the corrugating rolls 38, 40 mesh at nip 42, medium 24 will be fluted to become corrugated medium 25. Thereafter, the fluted medium is carried around roll 40 and at glue station 42 receives a coating of glue on the flute tips. Thereafter fluted medium 25 and first liner 18 are combined at nip 46.

In one embodiment, at a resin application station generally indicated at 44, a solution of a suitable strength enhancing resin, such as suitable isocyanate compound is sprayed or otherwise applied to all or a portion of the exposed surface of the already fluted traveling medium 25. As depicted in FIG. 1, immediately after the resin is applied, the typical bonding adhesive (commonly a starch solution) is applied at glue station 46. At resin application station 44, suitable means are provided, such as spray means 48, to apply a predetermined amount of resin solution to the traveling fluted medium. In another embodiment, just the tips of the flutes are coated with the suitable isocyanate resin.

After the strength enhancing resin solution is applied to the fluted medium and the medium combined with the first liner 18 and joined thereto, the traveling single faced material indicated at 50 is caused to travel upwardly and across a bridge station indicated at 52 and then further in a downstream direction around a fluted tension and drive station 54. Thereafter, the second liner 30 is caused to travel towards a nip 56 at the double facer station generally indicated at 58. Simultaneously, the single faced material 50 travels towards nip 56 and in the process passes adhesive application station 60 where the typical starch based adhesive is applied to the flute tips. Thereafter, the components are combined at double facer station 58 to form double backed combined board having the two liner sheets and the resin treated corrugated or fluted medium therebetween. Just downstream from nip 56 is top pressure roll 62 and therebeneath are a series of hot plates 64 to apply light pressure and heat to cure the standard adhesive and to initiate curing of the strength enhancing resin. Downstream pressure rolls 66, 68 also apply pressure. Extending between the last hot plate 64 and pressure rolls 66, 68 is cooling section 70. The standard combining adhesive generally cures very rapidly and immediately downstream from pressure rolls 66, 68 is a slitting and scoring station indicated at 72 and thereafter a cutoff station 74. Immediately after cutoff station 74 is well known means indicated at 76 for neatly piling the individual flat sheets of cut and scored combined board. After stacking, the strength enhancing resin is allowed to continue its curing under ambient temperature and moisture conditions.

In one alternative embodiment for applying the strength enhancing resin to the already fluted medium, the application station is located adjacent the double facer station 58, and will be functional to apply the suitable strength enhancing resin to the fluted medium. Again a suitable means for applying a preselected amount of resinous solution such as airless spray, air assist, electrostatic or the like may be used. The strength enhancing solution could be applied at almost any point after the medium is fluted, but before the covering liner is joined to the fluted medium.

Figure 2A:
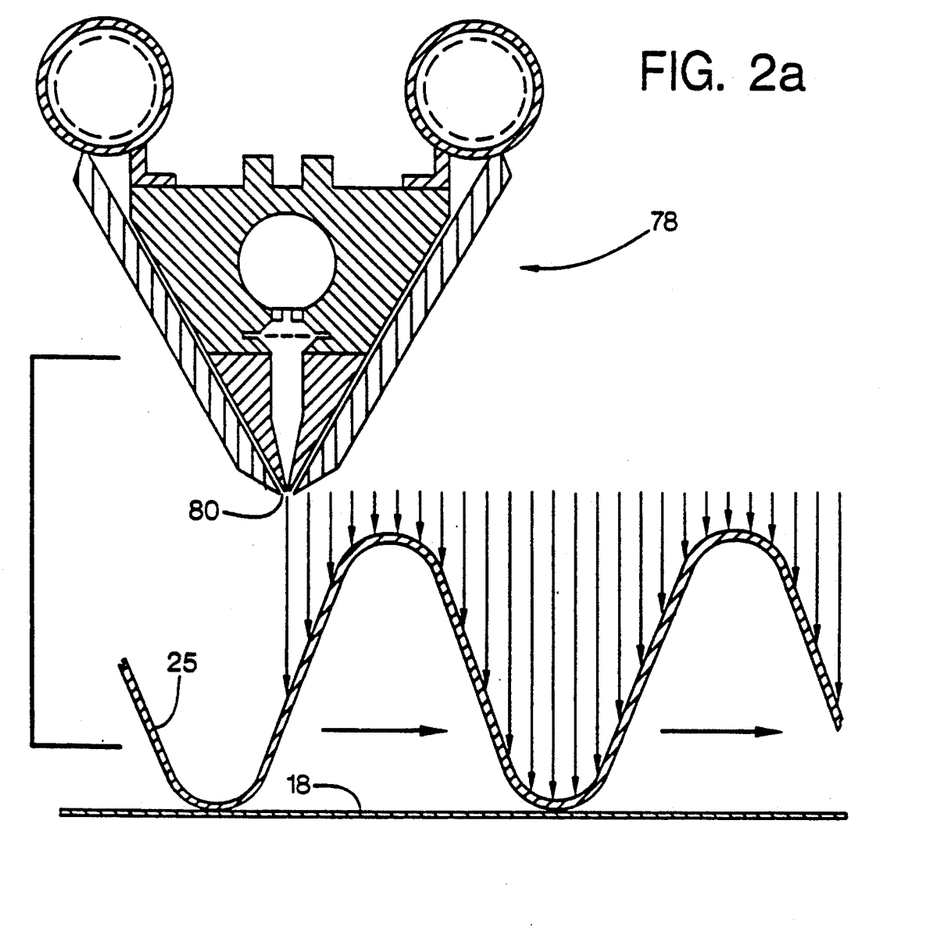
FIG. 2a is a representation of a liner sheet and a fluted layer of medium showing the resin being sprayed on the entire surface of the fluted medium.
Figure 2B:
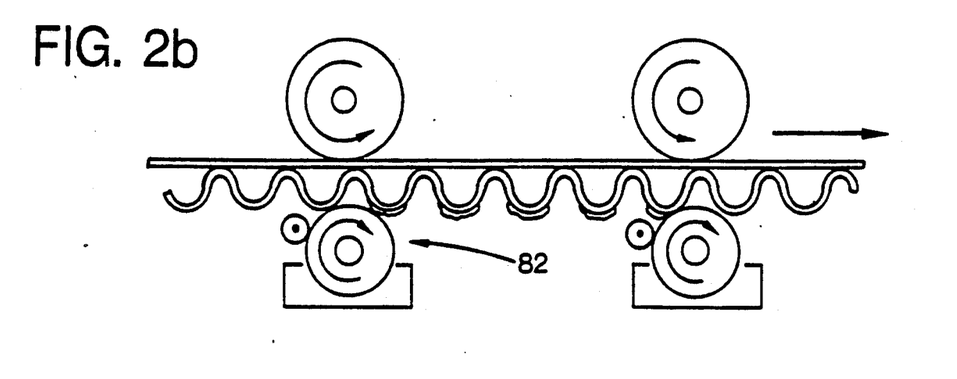
FIG. 2b is a similar representation showing the resin being applied onto the flute tips on with a flute tip roll coater.

In FIG. 2a a suitable spray head is indicated at 78 and is structured and functional to spray a mist solution of the suitable strength enhancing resin onto the fluted medium. Spray head 78 is of the type that has a plurality of individual nozzles, each indicated at 80, spaced across its width. Its detailed structure may be similar to the multiple orifice heads illustrated in many issued patents such as U.S. Pat. Nos. 31942,723 and 4,128,667. Illustrated in FIG. 2a is the fact that when a spray head is utilized, there will be relatively larger amounts or higher concentrations of the resin on the flute tips and in the flute troughs. Along the inclined flute side walls there will be relatively less resin. When, indicated at 82 in FIG. 2b, a roll coater is utilized only the flute tips will receive the resin. Test results will be described subsequently indicating certain strength properties of the alternate application means. It should be pointed out that over the selected width of the traveling fluted medium for resin application a uniform preselected amount of resin should be applied to derive the greatest benefits.

Turning now to operating characteristics and raw material selection it will be well understood by those skilled in the corrugated packaging field that typical linerboard for utilization in the present process can be produced and supplied in basis weights generally ranging from 26 to 90 pounds while medium basis weights range from approximately 26 to 40 pounds. As noted in the background of the invention, when it is desired to produce a container with a higher top-to-bottom compression strength or stacking strength, the traditional method calls for utilizing a higher basis weight linerboard on the outside of the container. This takes more fiber with the attendant higher costs. It is known that substantially increasing the basis weights of the fluted medium does not add to higher performance. In fact, it has been found that over time with higher basis weights in the medium, their top-to-bottom and flat crush strength characteristics either remained the same or actually decreased. This has been found to result from the fluting operation where the medium experiences a great deal of stretching and compressing while passing through the nip of the corrugated rolls. With thicker medium, fracturing of the material is more significant and, therefore, results in lower strengths.

Figure 3:
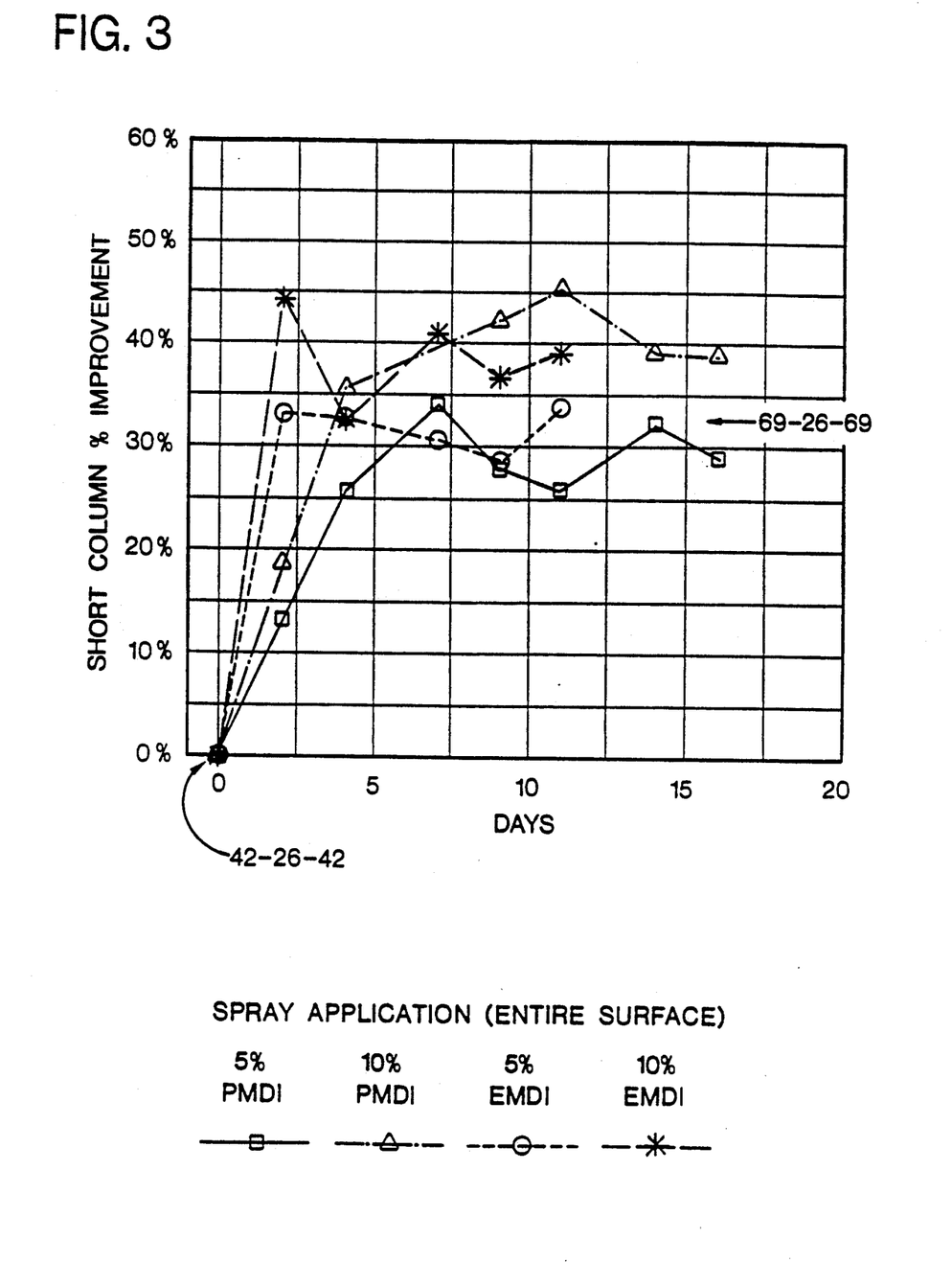
FIG. 3 is a graphic representation showing short column (ECT) improvement versus curing time for selected application amounts and two different isocyanate resins.
Figure 4:
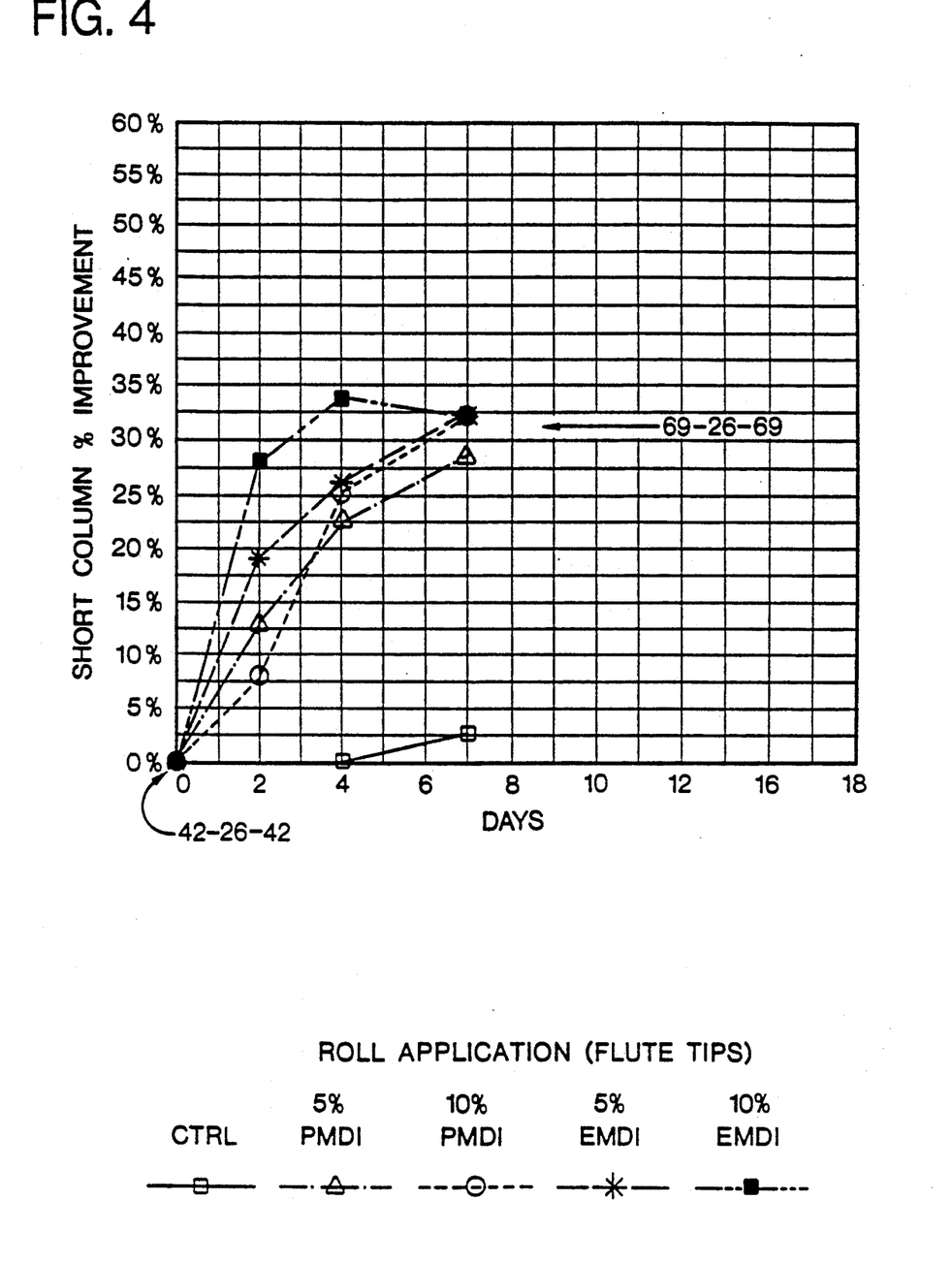
FIG. 4 is a graphic representation similar to FIG. 3 showing results when the resins are applied only to the flute tips.
Figure 5:
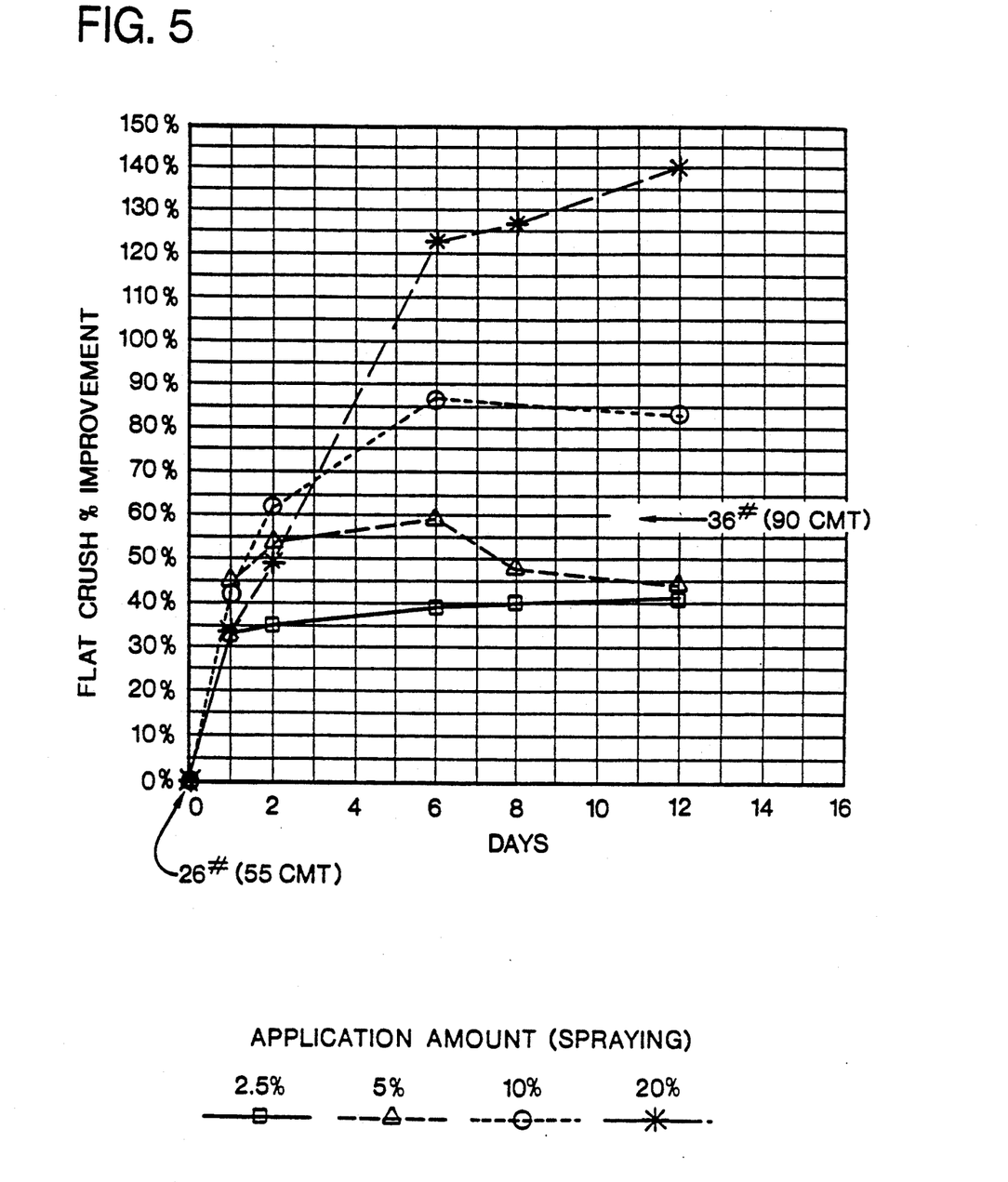
FIG. 5 is a graphic representation showing flat crush improvement versus time and selected application amounts when the resin is sprayed on the fluted medium.

The present invention actually provides a means for stiffening the medium after it has been corrugated or fluted, thereby avoiding problems encountered with past efforts. The fundamental effort is to strengthen the combined board by the resin addition and curing so that relatively less fiber can be utilized with the resulting combined board providing enhanced strength. One suitable isocyanate resin compound is polymeric methylene diphenyl diisocyanate (PMDI). Another is an emulsifiable polymeric methylene diphenyl diisocyanate (EMDI). As previously described, these chemical compounds in liquid form, or in the form of an emulsion in the case of EMDI, may be sprayed onto the fluted medium (over a selected width) thereby coating all surfaces of the fluted medium or it may be applied by a flute tip roll coater only to the flute tips. These types of resins begin to cure under conditions present in the double backer section of a corrugator and ultimately cure over time under ambient temperatures and in the presence of ambient moisture conditions. Total cure times are illustrated in the graphs of FIGS. 3-5. It could be applied to both surfaces of the fluted medium if desired. As will be apparent, varying amounts of the resin will enhance the strength to different degrees.

As mentioned earlier, the stretching and compressing experienced during the fluting operation weakens the medium significantly. The underside of the flute tip, the trough or valley, is compressed greatly while the surface of the medium on the outside of the flute tip experiences a great deal of stretching. As a consequence of this stretching, the outer surface of the flute tip develops localized weak areas or delamination "fissures."

The advantage of applying the strength resin after the medium has already been fluted is that it can coat the exposed "insides" of these delamination fissures after they develop. If the flat medium is coated with the chemical resin before fluting, these fissures open up only after the chemical is applied and thus the surface of the fissures that open up after fluting remain untreated. In this case the strength enhancing resin is not concentrated in the localized areas that need the enhancement. This mechanism also accounts for the fact that significant strength enhancement is obtained even when only the flute tip areas are treated.

FIGS. 3, 4 and 5 show resulting enhanced strength properties from practice of this process. What has been found is that when comparing a traditional combined board which is manufactured using 42 pound liner and 26 pound medium by using the present invention, this combination may actually be enhanced to an equivalent short column (top-to-bottom) strength characteristic of combined board having 69 pound liners and a 26 pound medium. Thus, the strength gain is approximately 33% by utilization of the present process.

The curves in the graphic figures illustrate very clearly the enhanced strength properties obtainable from using the isocyanate compounds for stiffening the medium, therefore, the resulting paperboard structure. For example, in FIG. 3 at the 00 point it is represented that this combined board is a typical 42-26-42 pound composite. Through a spraying application of 5% on a weight basis of the medium of either PMDI or EMDI and allowing a cure time of about 5 days for PMDI, the short column or top-to-bottom stacking strength improvement will approximate 33%. The EMDI cures somewhat quicker needing only two days to cure and provides relatively easier cleanup. With this improvement, we have the 42-26-42 combination with respect to the fiber components resulting in an equivalent strength of a 69-26-69 combination of materials. It becomes quite apparent that through the use of a relatively small amount of resin and with no increase in fiber, top-to-bottom strength properties may be significantly enhanced. With the application of 10% by weight it may be seen that an approximate 40% strength improvement is obtained. It is believed that strength enhancement will occur as the isocyanate resin compound is added in an amount within a range of from 0.5-50% by weight of the medium.

As shown by the curves on FIG. 4, similar results are obtained when only the flute tips are coated with the resin but in substantially the same amounts by weight. In the case of a 10% by weight addition (2.6 pound/MSF of combined board), whether it be PMDI or EMDI an approximate 33% improvement is obtained without any addition of fiber in either the liner or the medium.

In FIG. 5 curves are illustrated that show the typical percentage improvements in flat crush when spraying an isocyanate compound over flute tips, troughs and side walls in a substantially uniform matter. It can be noted, for example, that when adding 5% or 1.3 pound/MSF resin and allowing a cure time of about two days the flat crush is improved approximately 50% and results in an equivalent 36 pound basis weight medium. Flat crush improvement is a result of the strength enhancing resin being cured over substantially all portions of at least one side of the fluted medium. When the resin is applied only to the flute tips, flat crush is not improved appreciably, however, as noted in FIG. 4, short column improvement will still occur.

Since the isocyanate resin is applied to the fluted material within the confines of the corrugator at the locations previously described as being alternate locations, handling problems are significantly reduced. Significant strength enhancement is obtainable using a relatively small amount of the selected isocyanate resin, typically 10% or less by weight, applied evenly to the selected surface area of the medium after it has been fluted. When applying the resin to the flute tips, recycling will be easier since the resin does not cover the entire surface area of the flutes thereby making repulping easier. Larger amounts of resin may be added with enhanced strength, however, costs increase and recyclability may be compromised.

Other suitable chemical compounds that may be utilized to provide a stiffer fluted medium are various acrylics, polyvinyl acetates/alcohols, various latexes, styrene-maleic anhydride, epoxy resins, and others. They are resins that cure with little or no heat or pressure; preferably under ambient conditions. The use of catalysts can speed cure time. Since it is the fluted medium that contains the cured resin, the covering liners are unaffected and thus printability and other properties of the outer liner faces are retained.

Thus, it will be appreciated that a significant advantage can be obtained when practicing the process of the present invention. By utilizing a relatively small amount of strength enhancing resin applied to the medium after it has been fluted and allowing it to cure after bonding at least one liner to the medium, resulting strength properties of the combined board will be significantly enhanced. Selected areas across the width of the medium can be treated with the strengthening compound if desired.

While a detailed description has been given of the corrugated paperboard strength enhancing process it may occur to those skilled in the art to make modifications and additional enhancements thereto. All such modifications are intended to be included within the scope of the appended claims.

I claim:

1. A process for increasing the strength of combined corrugated paperboard using a strength enhancing resin, comprising:
   providing a fluted medium directly from an in-line corrugator following fluting of the medium by the in-line corrugator, the fluted medium having side edges and flutes with flute tips, flute troughs and flute side walls, the flutes extending transversely between the side edges and moving the fluted medium in a direction with the flutes extending transverse to the direction of motion of the fluted medium;
   applying a preselected amount of uncured strength enhancing isocyanate resin to the flute tips, flute troughs and flute walls on at least one surface of the moving fluted medium after it has been fluted, the resin being applied at higher concentrations to the flute tips than to the flute side walls;
   applying an adhesive to the surface of the fluted medium to which the isocyanate resin has been applied after applying the isocyanate resin;
   combining the fluted medium with at least a first liner; and
   allowing the resin to cure for a period of time sufficient to harden and provide enhanced strength to the paperboard.

2. The process as in claim 1 in which the resin is applied in an amount of from 0.5% to about 50% by weight of the medium.

3. The process as in claim 2 in which the resin is applied in an amount of from about 3% to about 15% by weight of the medium.

4. The process as in claim 1 in which the resin is selected from a group of isocyanate compounds which are curable under essentially ambient temperature and moisture conditions and essentially without pressure.

5. The process as in claim 4 in which the isocyanate compound is a polymeric methylene diphenyl diisocyanate.

6. The process as in claim 4 in which the isocyanate compound is an emulsifiable polymeric methylene diphenyl diisocyanate.

7. The process as in claim 1 in which the resin is applied by spray means.

8. The process as in claim 3 in which the resin is applied by means including a roll coater.

9. The process as in claim 1 in which the resin is applied to the fluted medium before the liner is combined therewith.

10. The process as in claim 9 in which the resin and the adhesive are both applied to the same side of the fluted medium.

11. The process as in claim 1 in which a second liner is combined with the fluted medium on the flute side opposite the first liner.

12. The process as in claim 11 in which the second liner is combined with the medium just after the resin is applied to the fluted medium.

13. The process as in claim 12 in which the resin is applied to the flutes on the side of the fluted medium to which the second liner will be adhesively bonded.

14. The process as in claim 1 in which the resin is applied to the flutes on both sides of the fluted medium.

15. The process according to claim 1 and including the step of forming a container from the combined corrugated paperboard.

16. The process according to claim 7 in which the resin is applied in an amount of 10% or less by weight of the medium.

17. A process for increasing the strength of combined corrugated paperboard using a strength enhancing resin, comprising:
   fluting a medium so that it has flutes with flute tips, flute troughs, and flute side walls;
   moving the fluted medium in a direction with the flutes extending transverse to the direction of motion of the fluted medium;
   spraying a preselected amount of uncured strength enhancing isocyanate resin to the moving fluted medium after it has been fluted so as to provide higher concentrations of the resin at the flute tips and flute troughs than on the flute side walls;
   applying an adhesive to the fluted medium after applying the isocyanate resin;
   combining the fluted medium with at least one liner; and
   allowing the resin to cure for a period of time sufficient to harden and provide enhanced strength to the paperboard.

18. The process according to claim 17 in which the resin is applied to the fluted medium in an amount of 10% or less by weight of the medium.

19. The process according to claim 1 in which the fluting and moving steps comprise the steps of moving the fluted medium in the direction directly from an in-line corrugator following fluting of the medium by the in-line corrugator.

20. The process according to claim 19 and including the step of forming a container from the combined corrugated paperboard.

* * * * *

UNITED STATES PATENT AND TRADEMARK OFFICE
CERTIFICATE OF CORRECTION

PATENT NO. : 5,332,458
DATED : July 26, 1994
INVENTOR(S) : Scott A. Wallick

It is certified that error appears in the above-identified patent and that said Letters Patent is hereby corrected as shown below:

ON THE TITLE PAGE

Please add Item 73 as follows:

[73]  Assignee:   Weyerhaeuser Company
                  Tacoma, Washington and

Signed and Sealed this

Sixteenth Day of December, 1997

Attest:

BRUCE LEHMAN

Attesting Officer       Commissioner of Patents and Trademarks